April 23, 1957 A. L. DOEPKEN 2,789,908
PROCESS OF PREPARING HAMS
Filed May 11, 1953

INVENTOR.
ALBERT L. DOEPKEN
BY
Brown, Critchlow, Flick & Hickham
HIS ATTORNEYS

United States Patent Office 2,789,908
Patented Apr. 23, 1957

2,789,908
PROCESS OF PREPARING HAMS
Albert L. Doepken, Wheeling, W. Va.
Application May 11, 1953, Serial No. 354,108
9 Claims. (Cl. 99—107)

This invention relates to the process of preparing hams for eating.

There used to be only one type of cooked ham, which was a ham that had been smoked and cooked with its bones in it. Smoking and cooking ham with the bones in is what gives it the distinctive ham flavor which people seek. Consequently, there would have been no occasion for any other type of cooked ham, were it not for the fact that bone-cooked hams cannot be profitably sliced and sold on a commercial basis, due to the obstruction caused by the bones, to an excessive quantity of meat fragments, to the lack of uniform slices and to an excessive amount of time that is required for slicing. In order to overcome these difficulties someone conceived the idea of extracting and discarding all of the bones from a pickled ham, tucking the loose ends of the ham into the cavities left by the bones, and then cooking or first smoking and then cooking the boneless ham. A boneless ham of this type solved the slicing problem, but at a decided sacrifice of flavor. In fact, its flavor is flat and insipid compared with the original bone-cooked hams, wherein the bones greatly enhance the flavor of the meat.

It is among the objects of this invention to provide a simple inexpensive process of preparing ham, as a result of which it is feasible to remove the bone from a smoked or smoked and cooked ham without tearing or mutilating the ham, thus making it possible to produce a cooked ham which can readily be sliced uniformly and without waste and will have the old fashioned bone-cooked ham flavor.

In accordance with this invention a pickled ham is smoked, or smoked and cooked, while containing one or more previously loosened ham bones which can easily be removed before the cooked ham is sliced. This loose bone method of preparing a ham is accomplished by first removing all bone from a ham and then replacing at least one bone in the ham to impart flavor to the ham when it is smoked. The replaced bone then can be removed before cooking, or it can be left in until after the ham has been cooked. In the latter case the loose bone is easily removed before the ham is sliced. In either case the loose bone is removed without lacerating the wall of the bone cavity.

Ways in which the invention can be practiced are illustrated in the accompanying drawings, in which—

Figure 1:
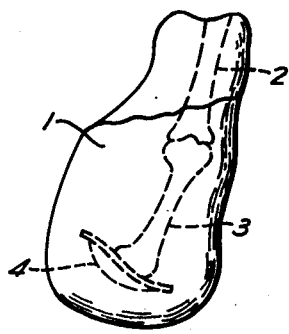
Fig. 1 is a side view of a pickled ham with its bones intact.
Figure 2:
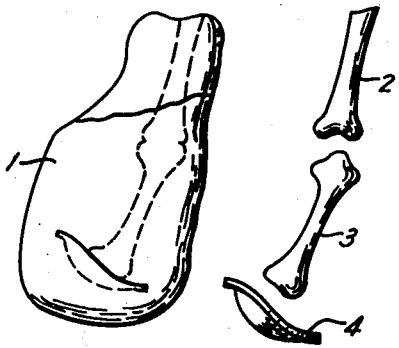
Fig. 2 is a side view of the same ham with the bones removed and shown beside it.
Figure 3:
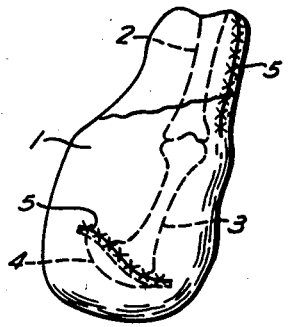
Fig. 3 shows the ham with all three bones replaced and ready to be smoked.

Referring to the first three figures of the drawings, a ham 1 which has been pickled in salt or brine in the usual way is slit along the side of its shank end to enable the shank bone 2 and the femur 3 to be removed. A slit is also made near the opposite end for removal of the aitch bone 4. These three bones are then replaced in their original cavities and the slit in the shank of the ham is closed by stitches 5. The ham, therefore, has the same general appearance that it had originally, but its bones are loose inside. Next, it is smoked in the usual way, and the bones impart to it the same fine flavor as possessed by an ordinary bone-smoked ham. This loose bone raw smoked ham can be sold like any smoked ham for cooking by the customer. Cooking it with the bones in will further improve the flavor. Before slicing, the bones are removed, so there is no problem at all in slicing the meat. They can be removed very easily, because they are loose in the ham and merely have to be pulled out. Although all three bones can be pulled out before starting to slice, it is preferred to first remove the bone at the end of the ham where it is wished to begin slicing, and then to slice until the next bone is reached, whereupon that one is pulled out and slicing is continued to the third bone. The ham just described has the old-fashioned flavor and appearance of a bone-cooked ham, yet it avoids its disadvantages.

Figure 4:
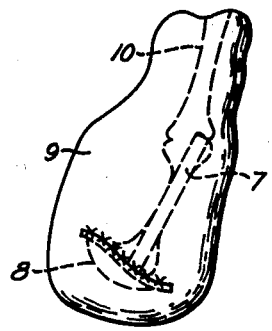
Fig. 4 is a view of another ham containing only two loose bones.
Figure 5:
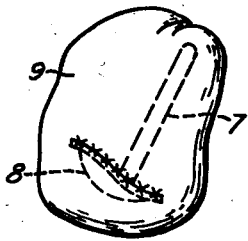
Fig. 5 is a view of the ham of the preceding figure prepared for smoking and cooking.

Another way of preparing a smoked ham for sale according to my method is to remove the skin from around the shank and to remove all of the bones as before. The femur 7 and preferably the aitch bone 8 are then replaced in the pickled ham 9, as shown in Fig. 4, and the shank bone is discarded. The loose end of the shank is tucked back into the cavity 10 left by the shank bone and secured in place by a stitch or two of twine. This gives the ham a more symmetrical and compact appearance, as shown in Fig. 5. The ham can be smoked as before with the two loose bones in it, and the smoked ham then cooked or sold for cooking by the consumer. Of course, any bone that is in the ham when the customer receives it is removed by him before that part of the ham which contains the bone is sliced.

Figure 6:
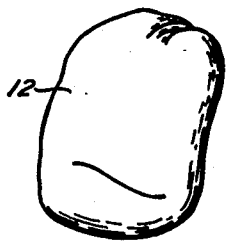
Fig. 6 shows a modification in which the bones have been removed from a ham like that shown in Fig. 5 after smoking but before cooking.

Another way of preparing a ham according to my method is to remove all bones from the pickled ham and then replace at least the femur in it. The ham is smoked with the replaced bone inside of it to produce the bone-smoked flavor, and then the loose bone is again removed and discarded. The ham 12, as shown in Fig. 6, then is cooked by the processor or consumer with no bones in it, which produces a solid cooked ham that will show little or none of the bone cavity when it is sliced.

To make it easier to replace and again remove the femur, the knuckles at the ends of the femur can be reduced in diameter to about the same size as the marrow portion after the bone is removed from the ham the first time. When the bone has approximately the same size throughout its length, as indicated in Figs. 4 and 5, it will slide into and out of the bone cavity much more easily. This is especially desirable when the loose femur is left in during cooking, because the knuckles may mutilate the cooked meat to some extent when the femur is pulled out, although not nearly to the same extent as if my loose bone method had not been used.

Figure 7:
Fig. 7 is a perspective view of a tube of bone fragments.

Another way of replacing bone in the ham before smoking is to first grind or chop up the bone and then place the fragments in some sort of permeable tube or bag that will keep them from escaping into the meat when the container is inserted in the cavity produced by the removal of bones. A fine mesh tubular bag 14 that is suitable for this purpose is shown in Fig. 7. Of course, this tube is removed before the ham is sliced.

The procedure described above for preparing a ham is also applicable to the preparation of pork shoulder, particularly that cut of the shoulder which is sold as a picnic or cally ham. My method used for such picnic hams will offer the packer a better outlet for a cut of meat that has a rather restricted demand, and at the same time it will provide the consumer with a lower priced and improved quality luncheon meat.

A major advantage of my loose bone method of preparing a ham is that the meat forming the wall of the cavity from which the bone is removed is not lacerated or otherwise mutilated, which would cause the ham slices to fall apart. The reason that the meat remains intact is that the bone is cut free from the meat while the home is in the pickled stage, before it has been smoked. At that time the meat fibers and tissues are strong and coherent and hold the wall of the bone cavity together. Although after the ham has been smoked the meat is tender and the tissues broken down so that the meat can easily be cut or torn apart, the wall of the bone cavity is not injured when the bone is slipped out because it was loosened before smoking. The result is that when the ham is sliced the slices do not crumble or fall apart, but yet they have the flavor of ham cooked with the bone in.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In the process of preparing readily sliced hams having the flavor of those smoked with their bones in, the method comprising removing all bone from a pickled ham, replacing a bone in the ham, and then smoking the ham, whereby replaced bone can be removed easily before slicing and without lacerating the wall of the cavity left by the bone in the ham.

2. In the process of preparing readily sliced hams having the flavor of those smoked with their bones in, the method comprising removing all bone from a pickled ham, replacing a bone in the ham, smoking the ham, and then removing replaced bone from the smoked ham without lacerating the wall of the cavity left in the ham by the bone.

3. In the process of preparing readily sliced hams having the flavor of those smoked with their bones in, the method comprising removing all bone from a pickled ham, replacing a bone in the ham, smoking the ham, and then cooking the ham, whereby replaced bone can be removed easily before slicing and without lacerating the wall of the cavity left by the bone in the cooked ham.

4. In the process of preparing readily sliced hams having the flavor of those smoked with their bones in, the method comprising removing all bone from a pickled ham, replacing a bone in the ham, smoking the ham, removing replaced bone from the smoked ham, and then cooking the boneless ham without lacerating the wall of the cavity left in the ham by the bone.

5. In the process of preparing readily sliced hams having the flavor of those smoked with their bones in, the method comprising removing the femur and shank and aitch bones from a pickled ham, replacing the femur in the ham, and then smoking the ham, whereby the femur can be removed easily before slicing and without lacerating the wall of the cavity left by the femur in the ham.

6. In the process of preparing readily sliced hams having the flavor of those smoked with their bones in, the method comprising removing the femur and shank and aitch bones from a pickled ham, reducing the diameter of the ends of the femur and replacing it in the ham, smoking the ham, and then cooking the ham, whereby the femur can be removed easily before slicing without multilating the ham.

7. In the process of preparing readily sliced hams having the flavor of those smoked with their bones in, the method comprising removing the femur and shank and aitch bones from a pickled ham, replacing the femur and aitch bone in the ham, tucking the end of the ham shank into the cavity left by the shank bone, and then smoking the ham, whereby subsequent removal of the replaced bone will not lacerate the wall of the cavity left in the ham by the bone.

8. In the process of preparing readily sliced hams having the flavor of those smoked with their bones in, the method comprising removing the femur and shank and aitch bones from a pickled ham, replacing the femur and aitch bone in the home, tucking the end of the ham shank into the cavity left by the shank bone, smoking the ham, and then cooking the ham, whereby the femur and aitch bones can be removed easily before slicing and without lacerating the wall of the cavity left by the bones in the ham.

9. In the process of preparing readily sliced hams having the flavor of those smoked with their bones in, the method comprising removing all bone from a pickled ham, chopping up the bone and placing it in a permeable container, placing the container in the bone cavity in the ham, smoking the ham, and removing said container before slicing the ham.

References Cited in the file of this patent
UNITED STATES PATENTS

| | | |
|---|---|---|
| 2,182,891 | Eikel | Dec. 12, 1939 |
| 2,299,946 | Alkire | Oct. 27, 1942 |
| 2,553,113 | Ruggiero | May 15, 1951 |